(12) United States Patent
Hashimoto

(10) Patent No.: US 6,405,063 B1
(45) Date of Patent: Jun. 11, 2002

(54) COMMUNICATION METHOD OF CORDLESS TELEPHONE THAT CAN ALWAYS MAKE CALL AS NECESSARY AND SUPPRESS UNNECESSARY WAITING OPERATION TO REDUCE CONSUMPTION POWER AND CORDLESS TELEPHONE

(75) Inventor: Tadao Hashimoto, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/313,262

(22) Filed: May 18, 1999

(30) Foreign Application Priority Data

May 28, 1998 (JP) .......................................... 10-166280

(51) Int. Cl.$^7$ ................................................. H04B 1/38
(52) U.S. Cl. ...................... 455/574; 455/343; 455/552; 455/426
(58) Field of Search ................................ 455/343, 434, 455/426, 552, 574, 462, 465, 421

(56) References Cited

U.S. PATENT DOCUMENTS

| 5,301,225 A | * | 4/1994 | Suzuki et al. ................ 455/574 |
| 5,428,638 A | * | 6/1995 | Cloffi et al. ................. 455/343 |
| 5,590,396 A | * | 12/1996 | Henry ......................... 455/426 |
| 5,627,882 A | * | 5/1997 | Chien et al. ................. 455/464 |
| 5,675,629 A | * | 10/1997 | Raffel et al. ................. 455/552 |
| 5,870,677 A | * | 2/1999 | Takahashi et al. ........... 455/463 |
| 5,887,259 A | * | 3/1999 | Zicker ......................... 455/434 |
| 6,078,822 A | * | 6/2000 | Tsujita ......................... 455/552 |
| 6,144,840 A | * | 11/2000 | Alton et al. ................. 455/38.3 |

FOREIGN PATENT DOCUMENTS

| GB | 2 250 892 | 6/1992 | |
| GB | 2 322 041 | 8/1998 | |
| GB | 2 333 208 | 7/1999 | |
| JP | 404345330 A | * 12/1992 | ............ H04B/7/26 |
| JP | 7-240966 | 9/1995 | |
| JP | 8-79829 | 3/1996 | |
| JP | 8-172666 | 7/1996 | |
| JP | 9-70073 | 3/1997 | |
| JP | 9-261755 | 10/1997 | |

* cited by examiner

*Primary Examiner*—Dwayne Bost
*Assistant Examiner*—Sonny Trinh
(74) *Attorney, Agent, or Firm*—Whitham, Curtis & Christofferson, PC

(57) ABSTRACT

A radio communication method includes (a) providing a mobile station and (b) changing a period. The mobile station can make a call through each of an independent system base station and an outdoor public system base station. The period is a period when a waiting operation to the independent system base station is performed. The period is changed based on a distance between the mobile station and the independent system base station.

14 Claims, 7 Drawing Sheets

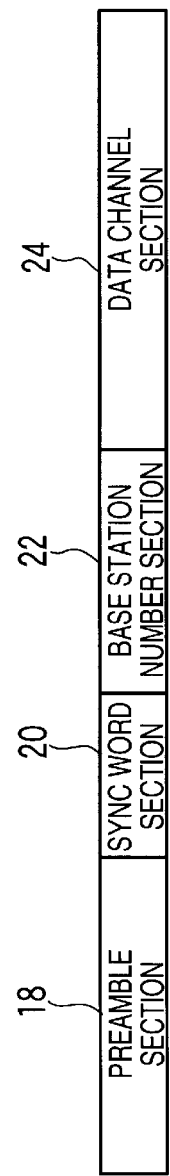
Fig. 5
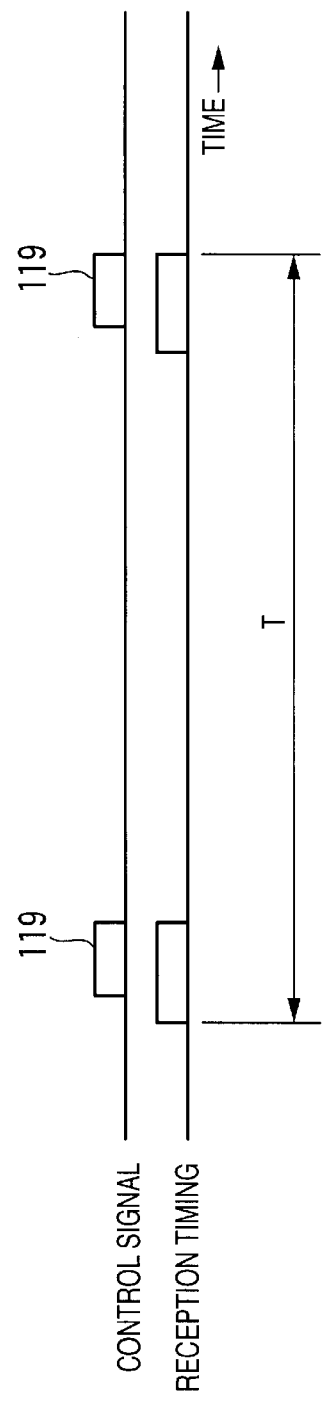
Fig. 7A
Fig. 7B

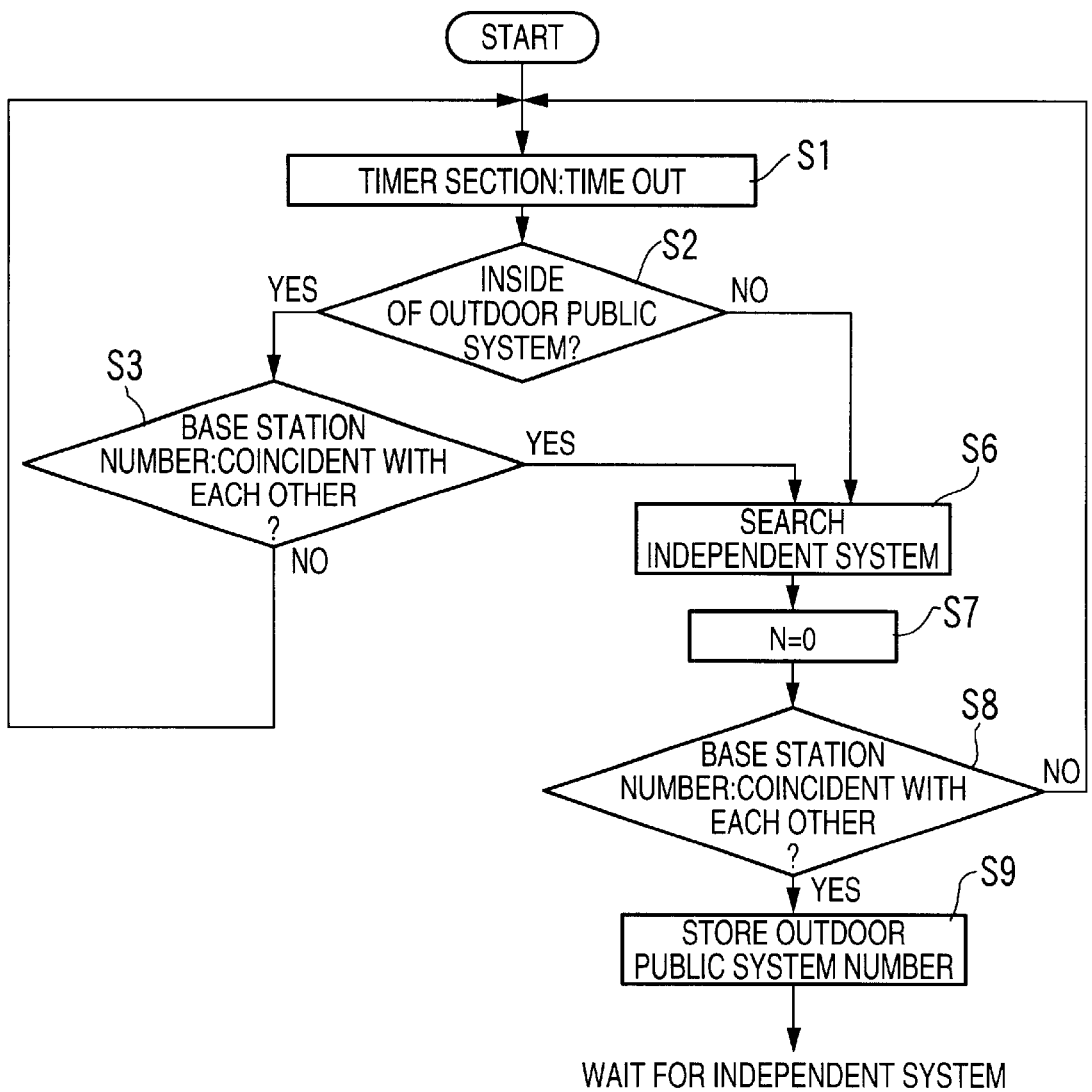

COMMUNICATION METHOD OF CORDLESS TELEPHONE THAT CAN ALWAYS MAKE CALL AS NECESSARY AND SUPPRESS UNNECESSARY WAITING OPERATION TO REDUCE CONSUMPTION POWER AND CORDLESS TELEPHONE

BACKGROUND OF THE INVENTION

1. Field of the Invention

The present invention relates to a cordless telephone that can make a call through each of an independent system base station and an outdoor public system base station, and its communication method.

2. Description of the Related Art

In a second generation cordless telephone system, a digital cordless telephone of the system can be registered in advance on each of an outdoor public telephone communication system and an independent (private) telephone communication system to be used as a personal station (mobile station) of both the outdoor public telephone communication system and the independent telephone communication system.

Hereafter, in this specification, the outdoor public telephone communication system is merely referred to as an outdoor public system. The independent telephone communication system is intended to be used as a local facility, such as a home or a business building. Also, it is merely referred to as an independent system. The independent system implies a telephone communication system for the home and the business building.

FIG. 1 is a schematic configuration view showing such a second generation cordless telephone system as a whole. In the example shown in FIG. 1, two outdoor public system base stations 104, 106 are provided in the vicinity of an independent system base station 102 connected to a telephone line 101. A part of a service area (receiving region) 108 of the independent system base station 102 and a part of a service area 110 of the outdoor public system base station 104 overlap with each other. A service area 112 of the outdoor public system base station 106 does not overlap with the service area 108, and then overlaps with a part of the service area 110.

The independent system base station 102 and the outdoor public system base stations 104, 106 periodically transmit respective control signals. As shown in timing charts of FIGS. 2A and 2B, usually, a cordless telephone 114 intermittently receives these control signals 116, 118 in reception periods TR1, TR2 that are alternately repeated at in a certain period T. In addition, the control signal 116 is a control signal transmitted from the independent system base station 102, and the control signal 118 is a control signal transmitted from the outdoor public system base station 104.

The cordless telephone 114 searches the received control signals 116, 118 to then judge whether or not base station numbers of the independent system and the outdoor public system are included in the control signals 116, 118. A state in which the cordless telephone 114 carries out the judgment is referred to as a waiting state. Then, if the base station number of the independent system is included as the judged result, the cordless telephone 114 can make a communication between the cordless telephone 114 and the independent system base station 102 and can make a call through the independent system base station 102. If the base station number of the outdoor public system is included as the judged result, the cordless telephone 114 can make a communication between it and the outdoor public system base station, and can also make a call through the outdoor public system base station.

As shown in FIG. 1, if the cordless telephone 114 exists at a location A, the cordless telephone 114 receives at a time division the control signals from both the independent system base station 102 and the outdoor public system base station 104 to then search the base station numbers of the respective systems in the respective control signals. On the other hand, if the cordless telephone 114 exists at a location B, it can receive only the control signal from the outdoor public system base station 106, and can not receive the control signal from the independent system base station 102. Thus, the cordless telephone 114 can make only a call through the outdoor public system base station 106, since it can not search the base station number of the independent system.

By the way, if the cordless telephone 114 exists outside the service area 108, the cordless telephone 114 can not make a call through the independent system base station 102. Thus, it is possible to stop a waiting operation of receiving the control signal from the independent system base station 102 to search the base station number of the independent system base station 102. Accordingly, it is possible to reduce a consumption power in the cordless telephone 114 and suppress an exhaustion of a power supply battery of the telephone to thereby make a callable time longer.

However, the following trouble is induced if the waiting operation to the independent system is immediately stopped, merely because the cordless telephone 114 exists outside the service area 108. This trouble is that the call in the independent system can not be made although the cordless telephone 114 exists inside the service area 108 when the cordless telephone 114 exists relatively close to the service area 108 and immediately moves into the service area 108.

In addition, the following techniques are well known as the cordless telephone.

The following technique is disclosed in Japanese Laid Open Patent Application (JP-A-Heisei 7-240966). A cordless telephone has a first synchronizer synchronous with an outdoor public system and a second synchronizer synchronous with a home (independent) system, and is synchronous with the home system inside a service area for the home system, and is synchronous with the public system inside a service area for the public system. Then, it can be automatically switched by an independent/public switch. If the cordless telephone moves from the service area of one system to the service area of the other system, it is automatically synchronous with the system.

The following technique is disclosed in Japanese Laid Open Patent Application (JP-A-Heisei 8-79829). When a power supply of a mobile station is turned ON, when a mobile station in the waiting state carries out an outside area detection, or when the mobile station in the waiting state is registered on a public base station adjacent to a home/business facility system, an automatic mode setting manger causes a signal detector from the public base station and a signal detector from the home/business facility base station to detect the signals from the public base station and the home/business facility base station. Then, it sets a mode for a home/business facility mode if there is a communicable home/business facility base station, and sets a mode for a public mode if the home/business facility base station can not make a communication and further there is the communicable public base station, and then establishes an automatic mode setting in which a priority is set for the home/business facility mode and a location registration associated therewith.

The following technique is disclosed in Japanese Laid Open Patent Application (JP-A-Heisei 8-172666). Immediately after the mobile station moves inside a reception area of an identification symbol (CS-ID) of an independent radio base station (CS) that can be accessed as a cordless telephone or outside the reception area, an identification symbol (BS-ID) of a public radio base station (BS) that can be accessed as a portable telephone receiving an electric wave is stored in the mobile station as a boundary area. Then, the mobile station automatically switches (1) a cordless telephone mode of waiting an incoming signal from the CS in an area where the CS-ID can be received, (2) a portable telephone mode of waiting an incoming signal from the BS in an area where the BS-ID can be received except a boundary area, and (3) a boundary mode of waiting the incoming signals from both the BS and the CS in an area where the BS-ID of the boundary area can be received.

Moreover, the following technique is disclosed in Japanese Laid Open Patent Application (JP-A-Heisei 8-172666). The mobile station can store therein a system call symbol of an independent system that can be accessed by an intrastation and an enterpriser identification symbol of a public system and freely move in a radio zone of the independent system and the public system and also carry out a transmission and a reception.

A control signal, such as an incoming signal to the mobile station or the like, is transmitted at a frequency different for each system from the independent system base station (CS) and a plurality of public system base stations (BS), and also intermittently transmitted at a timing different for each CS and BS.

Each system waits for the incoming signal through the intermittent reception in time to an intermittent reception timing from each CS or the plurality of BSs. Typically, the mobile station is ready for the signal reception from the mobile communication system side and always waits for the incoming signal from the CS or the plurality of BSs through the intermittent reception. If the reception of the incoming signal through the intermittent reception can not be done because of the movement outside the radio zone and the like, it waits for the incoming signal through the intermittent reception by again matching the timing with the intermittent transmission from other CS or the plurality of BSs inside the system through a continuous reception within a certain period.

The following technique is disclosed in Japanese Laid Open Patent Application (JP-A-Heisei 9-70073). At a time of an independent mode operation, a registration of location information at a time of a public mode operation is cancelled, and information in relation to an independent radio zone is registered. In addition, at a time of the public mode operation, the registration of the information in relation to the independent radio zone is cancelled, and the location information of a radio communication terminal in relation to a public radio zone is registered. Then the database in which such predetermined information is registered or removed is searched, and the control of the reception and the transmission of an incoming call are carried out in accordance with the result.

The following technique is disclosed in Japanese Laid Open Patent Application (JP-A-Heisei 9-261755). An identification symbol of the public base station whose area reaches the independent base station is stored in a built-in memory of a micro computer. If a synchronization with any one of control channels of the public base station and the independent base station is not established, a state of alternately receiving the control channels of the public base station and the independent base station is set. If the reception of the control channel of the public base station establishes the synchronization with the control channel thereof, it is judged whether or not an identification symbol included in the control channel coincides with the identification symbol stored in the built-in memory. If it coincides as the judged result, namely, if it is located in the vicinity of the independent base station, it proceeds to a state of receiving the control channel of the independent base station. On the other hand, if it does not coincide as the judged result, namely, if it is located away from the independent base station, the location registration is carried out, and it proceeds to a waiting state of the control channel of the public base station.

Therefore, an object of the present invention is to provide a communication method of a cordless telephone that can always make a call as necessary and suppress an unnecessary waiting operation to reduce a consumption power, and a cordless telephone as the same.

SUMMARY OF THE INVENTION

The present invention has been made to solve the above-described problems of the conventional communication method of a cordless telephone and the cordless telephone. An object of the present invention is to provide a communication method of a cordless telephone that can always make a call as necessary and suppress an unnecessary waiting operation to reduce a consumption power, and a cordless telephone as the same.

In order to achieve an aspect of the present invention, a radio communication method includes (a) providing a mobile station which can make a call through each of an independent system base station and an outdoor public system base station, and (b) changing a period when a waiting operation to the independent system base station is performed, based on a distance between the mobile station and the independent system base station.

In this case, the (b) step includes stopping the waiting operation to the independent system base station, instead of the changing the period.

Also in this case, when a value of the distance is larger than a predetermined value, the (b) step includes making the period longer than that of a case that the distance value is not larger than the predetermined value.

Further in this case, the (b) step includes detecting the distance based on a receiving signal received by the mobile station from the outdoor public system base station adjacent to the independent system base station.

In this case, the (a) step includes providing a plurality of the outdoor public system base stations, and the outdoor public system base station adjacent to the independent system base station is one of the plurality of outdoor public system base stations which is positioned the closest to the independent system base station.

Also in this case, the (b) step includes changing the period, depending on whether the mobile station belongs to a specific region, wherein the specific region includes at least a part of a receiving region of the independent system base station and is wider than the at least a part of the receiving region of the independent system base station.

Further in this case, the specific region includes the receiving region of the independent system base station and a receiving region of the outdoor public system base station adjacent to the independent system base station.

In this case, the (b) step includes (c) judging in a first period as the period whether or not the mobile station belongs to a receiving region of the independent system base station as an independent receiving region, based on a receiving signal received by the mobile station, (d) detecting, as an unspecific outdoor public system base station, the outdoor public system base station, to whose receiving region the mobile station belongs, regardless of whether the mobile station belongs to the independent receiving region or not, (e) detecting, as a specific outdoor public system base station, the outdoor public system base station, to whose receiving region the mobile station belongs, when it is judged as a result of the (c) step that the mobile station belongs to the independent receiving region, (f) comparing the detected unspecific outdoor public system base station with the detected specific outdoor public system base station, (g) detecting the distance based on a result of the (f) step, (h) judging whether or not the detected distance is larger than a predetermined value, and (i) performing the (c) step in a second period longer than the first period when it is judged as the result of the (c) step that the mobile station does not belong to the independent receiving region and it is judged as a judgment result of the (h) step that the detected distance is larger than the predetermined value.

Also in this case, the (c) step includes judging that the mobile station belongs to the independent receiving region, when the receiving signal received by the mobile station has an independent system base station identification signal indicating that the receiving signal is transmitted from the independent system base station, the (d) step includes detecting the unspecific outdoor public system base station, based on an outdoor public system base station identification signal included in the receiving signal, indicating that the receiving signal is transmitted from the outdoor public system base station, and the (e) step includes detecting the specific outdoor public system base station, when it is judged that a first receiving signal corresponding to the receiving signal has the independent system base station identification signal as a result of the (c) step, based on the outdoor public system base station identification signal included in a second receiving signal received by the mobile station immediately after the first receiving signal.

Further in this case, the (e) step includes detecting the specific outdoor public system base station, based on the outdoor public system base station identification signal included in the receiving signal received next to the independent system base station identification signal by the mobile station.

In this case, the (e) step includes detecting the specific outdoor public system base station, based on the outdoor public system base station identification signal included in the receiving signal received in a same period as the period when the independent system base station identification signal is received.

Also in this case, the (f) step is performed each time the unspecific outdoor public system base station is detected as a result of the (d) step.

Further in this case, the radio communication method further includes (j) performing the (c) step in the first period, when it is judged as the result of the (c) step that the mobile station belongs to the independent receiving region or when it is judged as the result of the (h) step that the detected distance is not larger than the predetermined value, and when the (c) step is performed in the second period.

In this case, the (b) step includes (c) judging in a first period as the period whether or not the mobile station belongs to a receiving region of the independent system base station as an independent receiving region, based on a receiving signal received by the mobile station, (d) detecting, as an unspecific outdoor public system base station, the outdoor public system base station, to whose receiving region the mobile station belongs, regardless of whether the mobile station belongs to the independent receiving region or not, (e) detecting, as a specific outdoor public system base station, the outdoor public system base station, to whose receiving region the mobile station belongs, when it is judged as a result of the (c) step that the mobile station belongs to the independent receiving region, (f) comparing the detected unspecific outdoor public system base station with the detected specific outdoor public system base station, and (k) performing the (c) step in a second period longer than the first period when it is judged as the result of the (c) step that the mobile station does not belong to the independent receiving region and it is judged as a result of the (f) step that the unspecific outdoor public system base station and the specific outdoor public system base station do not coincide with each other.

Also in this case, the (b) step includes performing the (b) step for each the period.

In order to achieve another aspect of the present invention, a radio communication apparatus that can make a call through each of an independent system base station and an outdoor public system base station includes a timer for counting a time period during which a waiting operation to the independent system base station is performed, and a control section for controlling the timer such that the time period is changed in a accordance with a distance between the radio communication apparatus and the independent system base station.

In this case, the control section controls the timer such that the waiting operation is stopped, instead of controlling the timer such that the time period is changed.

Also in this case, when the distance is larger than a predetermined value, the control section controls the timer to make the time period longer than that of a case in which the distance is not larger than the predetermined value.

Further in this case, the control section detects the distance based on a receiving signal received by the radio communication apparatus from the outdoor public system base station adjacent to the independent system base station.

In this case, the control section changes the time period, depending on whether the radio communication apparatus belongs to a specific region, wherein the specific region includes at least a part of a receiving region of the independent system base station and is wider than the at least a part of the receiving region of the independent system base station.

Also in this case, the control section includes a judging means for judging as a specific judgment in a first period whether or not the radio communication apparatus belongs to a receiving region of the independent system base station as an independent receiving region, based on a receiving signal received by the radio communication apparatus, a first detecting means for detecting, as an unspecific outdoor public system base station, the outdoor public system base station, to whose receiving region the radio communication apparatus belongs, regardless of a result of the specific judgement, a second detecting means for detecting, as a specific outdoor public system base station, the outdoor public system base station, to whose receiving region the radio communication apparatus belongs, when the judging means judged that the radio communication apparatus belongs to the independent receiving region as the specific judgement, a comparing means for comparing the detected unspecific outdoor public system base station with the detected specific outdoor public system base station, a detecting means for detecting the distance based on a comparison result by the comparing means, a determining means for determining whether or not the detected distance is larger than a predetermined value, and a control means for controlling the judging means such that the judging means performs the specific judgment in a second period longer than the first period when the judging means judged that the radio communication apparatus does not belong to the independent receiving region and the determining means determined that the detected distance is larger than the predetermined value.

Further in this case, the judging means judges that the radio communication apparatus belongs to the independent receiving region, when the receiving signal received by the radio communication apparatus has an independent system base station identification signal indicating that the receiving signal is transmitted from the independent system base station, the first detecting means detects the unspecific outdoor public system base station, based on an outdoor public system base station identification signal included in the receiving signal, indicating that the receiving signal is transmitted from the outdoor public system base station, and the second detecting means detects the specific outdoor public system base station when the judging means judged that a first receiving signal corresponding to the receiving signal has the independent system base station identification signal, based on the outdoor public system base station identification signal included in a second receiving signal received by the radio communication apparatus immediately after the first receiving signal.

In this case, the control section includes a judging means for judging as a specific judgment in a first period whether or not the radio communication apparatus belongs to a receiving region of the independent system base station as an independent receiving region, based on a receiving signal received by the radio communication apparatus, a first detecting means for detecting, as an unspecific outdoor public system base station, the outdoor public system base station of which the radio communication apparatus belongs to a receiving region, regardless of a result of the specific judgment, a second detecting means for detecting, as a specific outdoor public system base station, the outdoor public system base station of which the radio communication apparatus belongs to a receiving region, when the judging means judged that the radio communication apparatus belongs to the independent receiving region as the specific judgment, a comparing means for comparing the detected unspecific outdoor public system base station with the detected specific outdoor public system base station to determine that the detected unspecific outdoor public system base station and the detected specific outdoor public system base station coincide with each other or not, and a control means for controlling the judging means such that the judging means performs the specific judgment in a second period longer than the first period when the judging means judged that the radio communication apparatus does not belong to the independent receiving region and the comparing means determined that the unspecific outdoor public system base station and the specific outdoor public system base station do not coincide with each other.

In order to achieve still another aspect of the present invention, a radio communication system includes an independent system base station, an outdoor public system base station, and a radio communication apparatus that can make a call through each of the independent system base station and the outdoor public system base station, wherein the radio communication apparatus includes a timer for counting a time period during which a waiting operation to the independent system base station is performed, and a control section for controlling the timer such that the time period is changed, in a accordance with a distance between the radio communication apparatus and the independent system base station.

In order to achieve yet still another aspect of the present invention, a computer readable recording medium for a recording a program for a process includes (c) judging as a specific judgment in a first period whether or not a mobile station belongs to a receiving region of an independent system base station as an independent receiving region, based on a receiving signal received by the mobile station, (d) detecting, as an unspecific outdoor public system base station, an outdoor public system base station, to whose receiving region the mobile station belongs, regardless of a result of the specific judgment, (e) detecting, as a specific outdoor public system base station, the outdoor public system base station, to whose receiving region the mobile station belongs, when it is judged as the result of the specific judgment that the mobile station belongs to the independent receiving region, (f) comparing the detected unspecific outdoor public system base station with the detected specific outdoor public system base station, and (j) performing the (c) step in a second period longer than the first period when it is judged as the result of the specific judgment that the mobile station does not belong to the independent receiving region and it is judged as a result of the (f) step that the unspecific outdoor public system base station and the specific outdoor public system base station do not coincide with each other.

BRIEF DESCRIPTION OF THE DRAWINGS

A more complete understanding of the teachings of the present invention may be acquired by referring to the accompanying figures, in which like reference numbers indicate like features and wherein:

FIG. 5 is a format view showing a control signal transmitted from a base station;

FIG. 7A is a timing chart showing a transmission timing of a control signal when a cordless telephone in FIG. 3 waits for the control signal from an outdoor public system base station;

FIG. 7B is a timing chart showing a reception timing of a control signal when the cordless telephone in FIG. 3 waits for the control signal from the outdoor public system base station; and FIG. 8 is a flowchart showing a variation example of the operations of the cordless telephone in FIG. 3.

DESCRIPTION OF THE PREFERRED EMBODIMENTS

Referring now to drawings, various preferred embodiments according to the present invention will be described in detail.

An Embodiment of a cordless telephone according to the present invention will be described below with reference to the attached drawings. An embodiment of a communication method of the cordless telephone according to the present invention will be described below at the same time.

Figure 3:
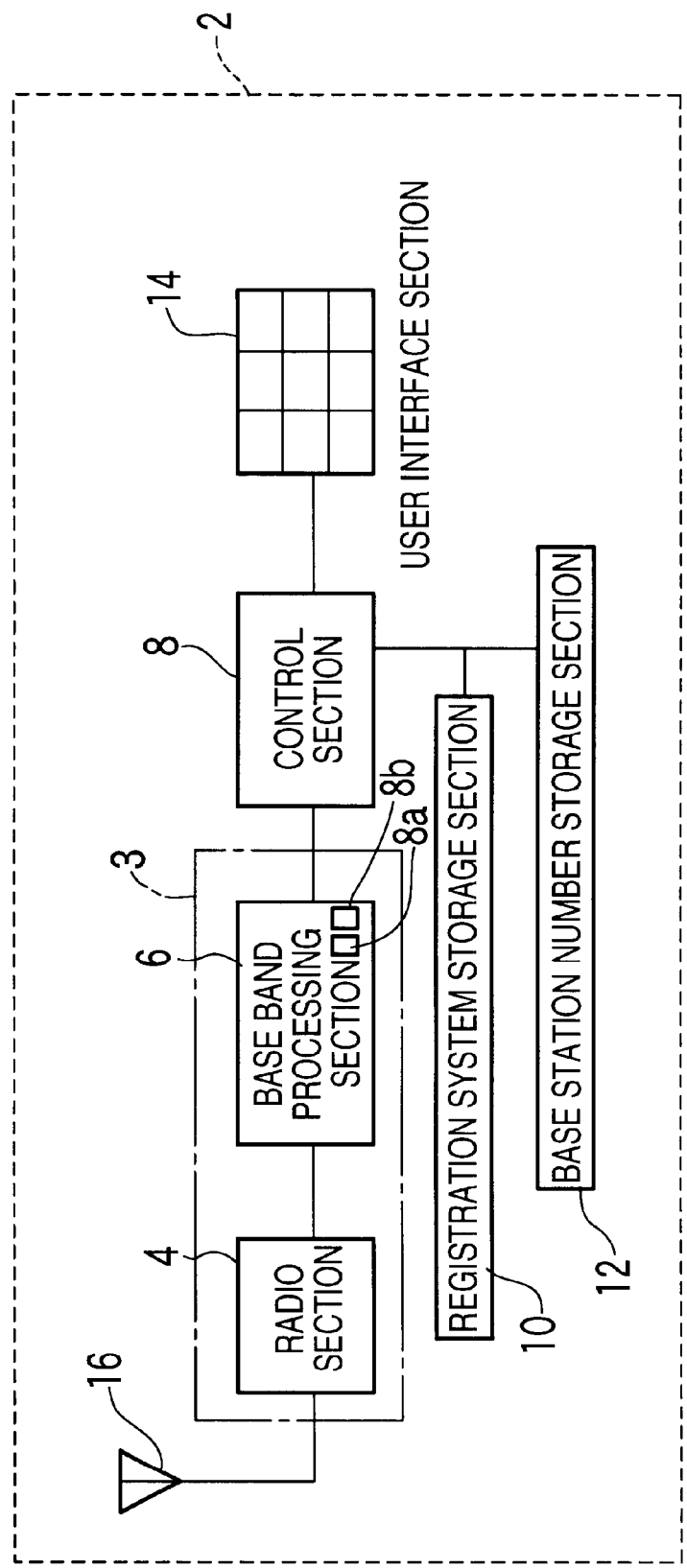
FIG. 3 is a block diagram showing a cordless telephone of an embodiment of the present invention.
Figure 4:
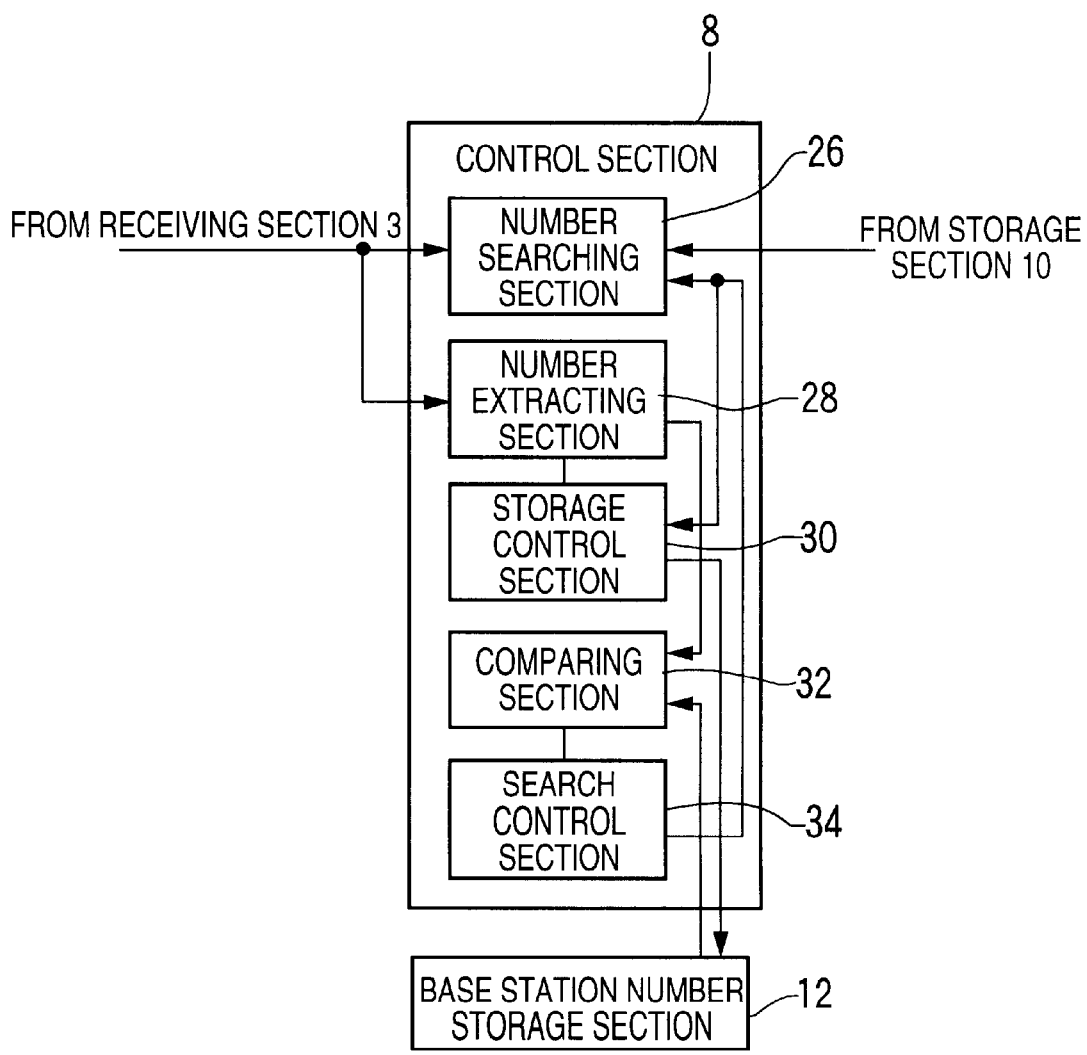
FIG. 4 is a block diagram showing a control section of an embodiment of a cordless telephone according to the present invention.

As shown in FIGS. 3 and 4, a cordless telephone 2 in this embodiment is provided with a radio section 4, a base band processing section 6, a control section 8, a registration system storage section 10 (a second storing unit), a base station number storage section 12 (a storing unit), a user interface section 14 containing a plurality of operational keys and the like.

The radio section 4 and the base band processing section 6 constitute a receiving unit 3 according to the present invention.

The radio section 4 receives high frequency signals from an independent system base station and an outdoor public system base station through an antenna 16. The base band processing section 6 performs a demodulation process and the like on the high frequency signals received by the radio section 4 to extract a control signal.

As shown in FIG. 5, the control signal includes a preamble section 18, a synchronous word section 20, a base station number section 22 and an data channel section 24. The respective sections are arrayed in this order.

As shown in FIG. 4, the control section 8 functionally includes a number searching section 26, a number extracting section 28, a storage control section 30, a comparing section 32 and a search control section 34 in accordance with the present invention.

The number searching section 26 periodically searches the control signal received by the receiving unit 3 in a first time interval (a first period) to then judge whether or not a base station number of the independent system is included in the control signal.

The number extracting section 28 periodically extracts a base station number of the outdoor public system from the control signal received by the receiving unit 3.

The storage control section 30 stores the base station number of the outdoor public system extracted by the number extracting section 28 in the base station number storage section 12, when the number searching section 26 judges that the base station number of the independent system is included in the control signal.

The comparing section 32 compares the base station number extracted by the number extracting section 28 with the base station number stored in the base station number storage section 12, each time the number extracting section 28 extracts the base station number of the outdoor public system.

If the number searching section 26 judges that the base station number of the independent system is not included in the control signal and if the base station number of the outdoor public system and the base station number stored in the base station number storage section 12 do not coincide with each other as the comparison result of the comparing section 32, the search control section 34 controls the number searching section 26 to judge whether or not the base station number of the independent system is included in the control signal in a second time interval longer than the first time interval.

The operations of the cordless telephone 2 will be described below.

Figure 1:
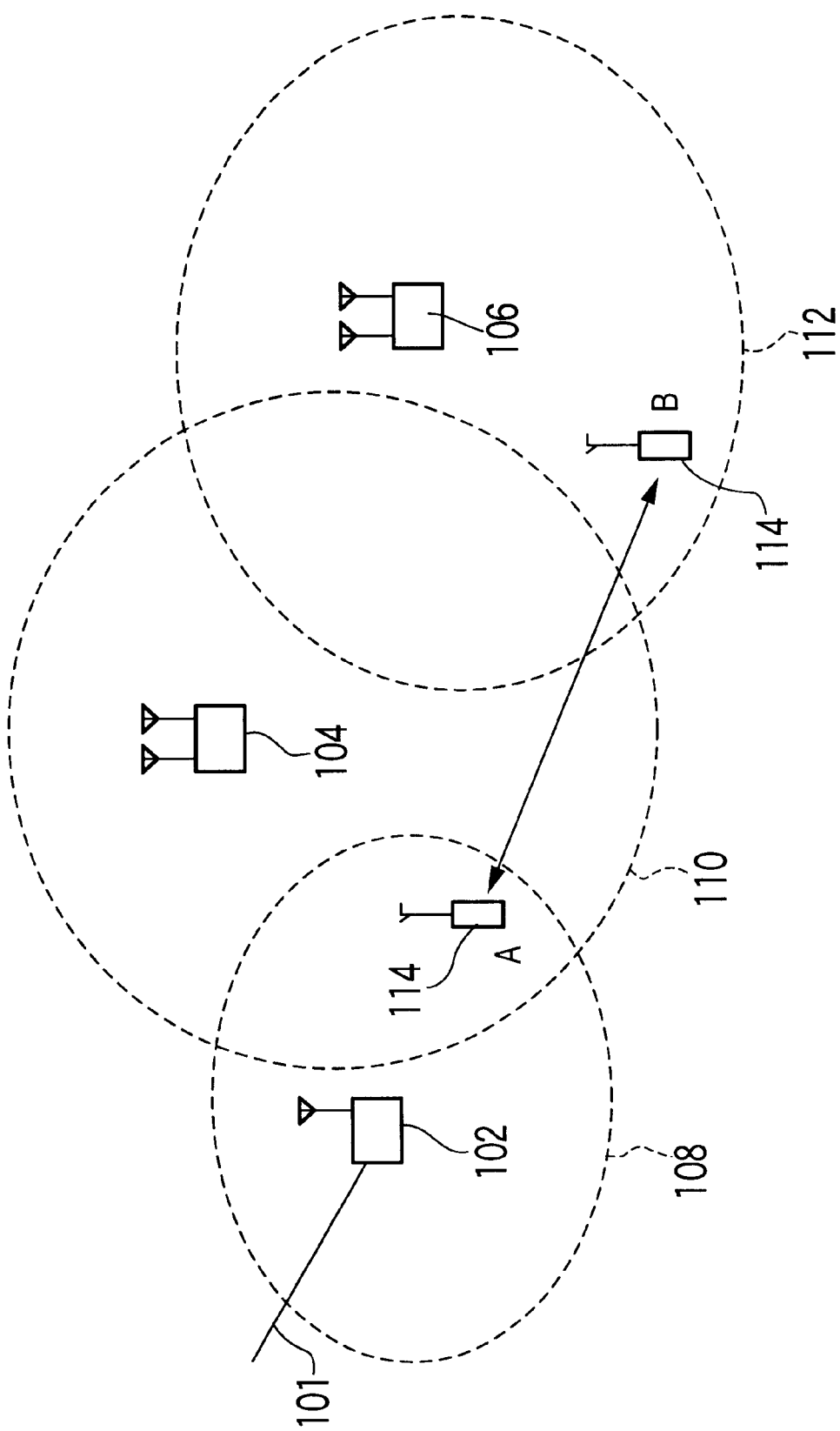
FIG. 1 is a schematic configuration view showing a second generation cordless telephone system as a whole.

At first, the operation is described if the cordless telephone 2 exists at the location A where the service areas 108, 110 of the independent system base station 102 and the outdoor public system base station 104 overlap with each other as shown in FIG. 1.

Figure 2:
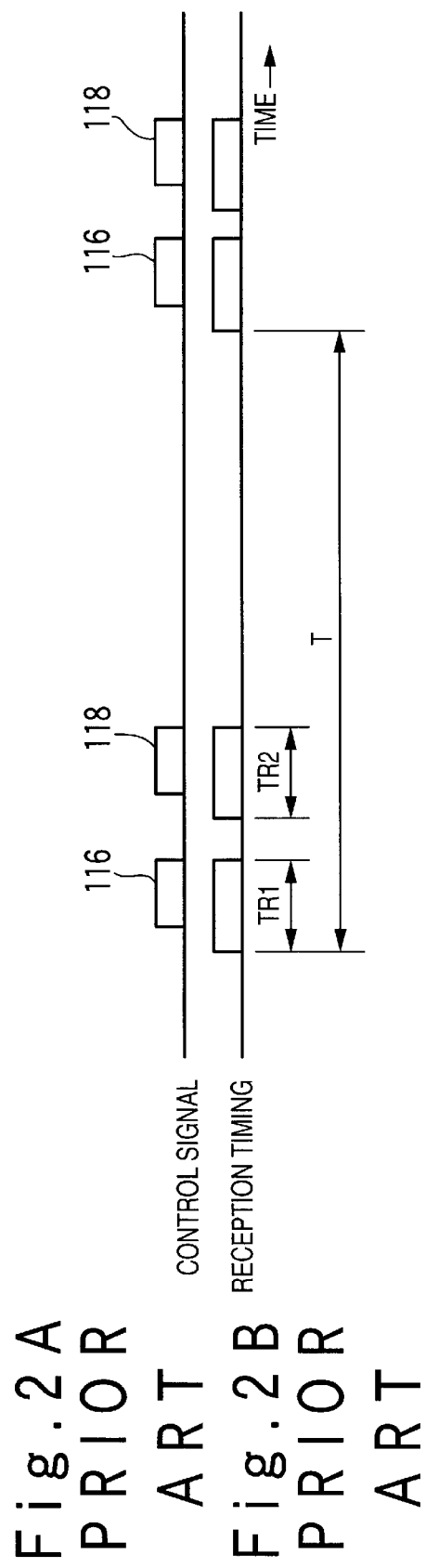
FIG. 2A is a timing chart showing a transmission timing of a control signal when a cordless telephone waits for the control signals from both an independent system base station and an outdoor public system base station.
FIG. 2B is a timing chart showing a reception timing of a control signal when a cordless telephone waits for the control signals from both the independent system base station and the outdoor public system base station.

Inside this area, the cordless telephone 2 can receive the control signals from both the independent system base station 102 and the outdoor public system base station 104. As shown in FIG. 2B, the number searching section 26 periodically searches the control signal received by the receiving unit 3 in the first time interval (a period T), for example, in a time interval of about 10 seconds to then judge whether or not the base station number of the independent system is included in the control signal. In this case, the number searching section 26 can receive the control signal 116 to then detect the base station number of the independent system. Thus, the judged result becomes positive.

By the way, the number searching section 26 extracts the base station number from the control signal 116, and then compares the extracted base station number with the base station number of the independent system stored in advance in the registration system storage section 10 to judge that the base station number of the independent system is included in the control signal 116 if the two compared base station numbers coincide with each other.

In addition, the control section 8 has a timer section 8a for taking a time-out for each about 10 seconds. The number searching section 26 judges whether or not the base station number of the independent system is included in the control signal, each time this timer section 8a takes the time-out.

While the number searching section 26 carries out the judgment of the base station number as mentioned above, the number extracting section 28 extracts the base station number of the outdoor public system from the control signal received by the receiving unit 3 each time the timer section 8a takes the time-out.

The storage control section 30 stores the base station number of the outdoor public system base station 104 extracted by the number extracting section 28 in the base station number storage section 12, since the judged result of the number searching section 26 is positive as mentioned above.

Figure 6:
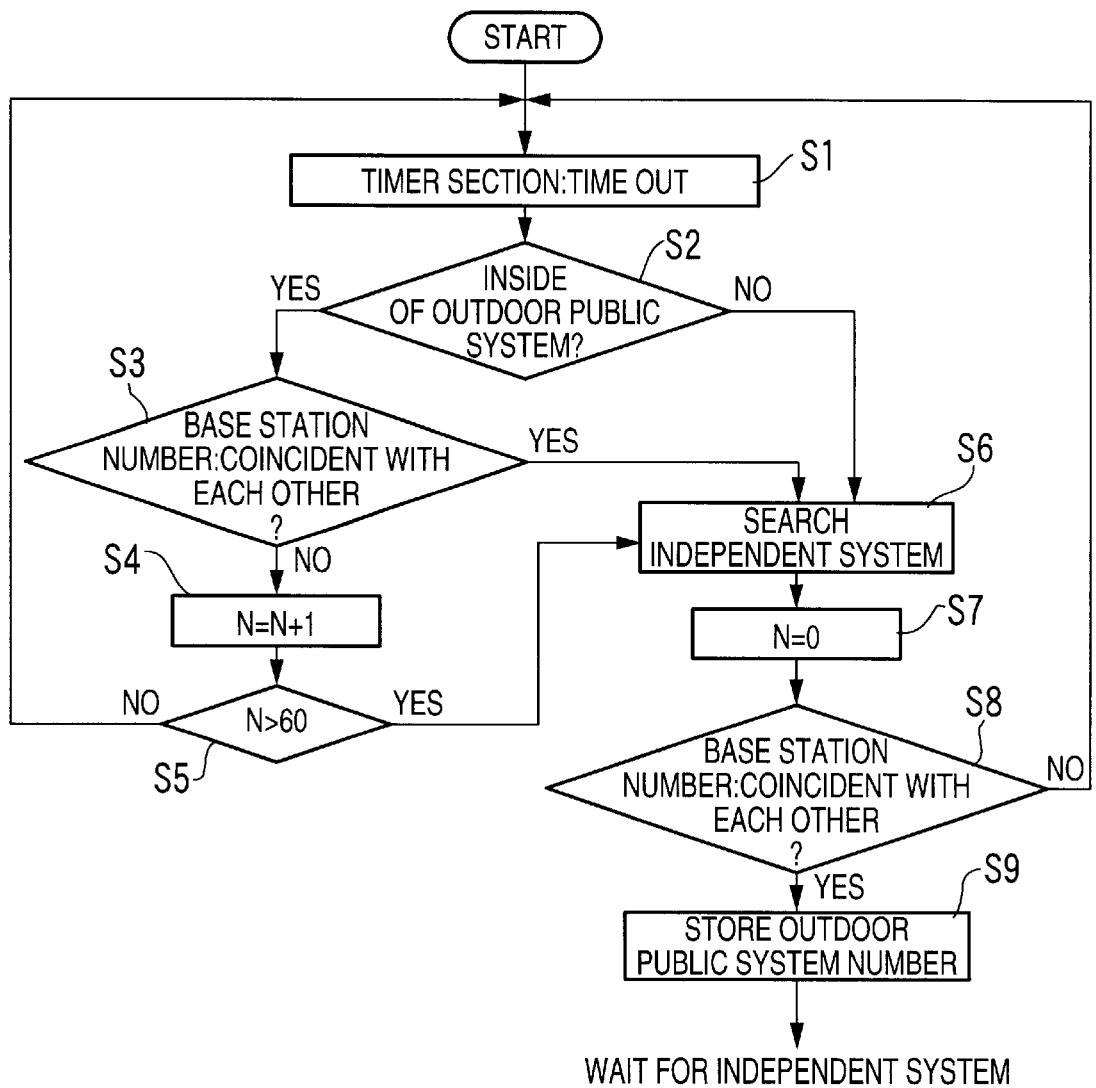
FIG. 6 is a flowchart showing operations of the cordless telephone in FIG. 3.

The operations if the cordless telephone 2 moves from the point A of FIG. 1 to the point B inside the service area 112 will be described below with reference to a flowchart in FIG. 6.

Also in this case, if the timer section 8a takes the time-out (Step S1), the number extracting section 28 extracts the base station number of the outdoor public system from the control signal received by the receiving unit 3.

Here, since the cordless telephone 2 exists inside the service area 112, the cordless telephone 2 can correctly extract the base station number of the outdoor public system base station 106 (YES at Step S2).

Then, the comparing section 32 compares the base station number extracted by the number extracting section 28 with the base station number of the outdoor public system stored in the base station number storage section 12 (Step S3).

In this case, since the base station number of the outdoor public system base station 104 is stored in the base station number storage section 12, the compared result becomes inconsistent (NO at Step S3).

At this time, since the cordless telephone 2 exists outside the service area 108, the base station number of the independent system base station 102 is not included in the control signal received by the receiving unit 3. Thus, the number searching section 26 judges that the base station number of the independent system is not included in the control signal.

That is, the number searching section 26 judges that the base station number of the independent system is not included in the control signal, and the base station number of the outdoor public system and the base station number stored in the base station number storage section 12 do not coincide with each other as the comparison result of the comparing section 32. Thus, the search control section 34 controls the number searching section 26 to judge whether or not the base station number of the independent system is included in the control signal in the second time interval longer than the first time interval.

Actually, the control section 8 has a counter unit 8b. If the result compared by the comparing section 32 is inconsistent (NO at Step S3), the search control section 34 counts up a count value of this counter unit 8b by 1 (Step S4). Then, in this embodiment, if the count value N of the counter unit 8b exceeds 60 (YES at Step S5), the number searching section 26 carries out the above-mentioned judging operation (Step S6).

On the other hand, if the value N of the counter unit 8b is equal to or less than 60, the operation returns back to the step S1, and the number extracting section 28 waits for the time-out of the timer section 8a.

As mentioned above, the number extracting section 28 extracts the base station number of the outdoor public system in the time interval of about 10 seconds corresponding to the time-out of the timer section 8a (Step S2). Thus, if the cordless telephone 2 continues to exist at the point B, in a time interval of about 600 seconds, namely, about 10 minutes (YES at Step S5), the number searching section 26 judges whether or not the base station number of the independent system is included in the control signal (Step S6). Hence, only the waiting operation of the control signal 119 from the outdoor public system base station 106 is carried out in most of the period, as shown in the flowchart of FIG. 7.

In this embodiment, if the cordless telephone 2 moves into the service area 112 of the outdoor public system base station 106 far away from the service area 108 of the independent system base station 102, the number searching section 26 performs the waiting operation to the independent system base station 102 in the time interval of about 10 minutes equal to 60 times the normal time interval. Accordingly, it is possible to reduce the consumption power of the cordless telephone 2 to thereby make the life of the battery longer.

In this case, since the cordless telephone 2 exists at the location far away from the independent system base station 102, there is no possibility that the cordless telephone 2 immediately returns back into the service area of the independent system. Thus, there is no trouble even if the time interval of the waiting operation to the independent system base station 102 is made longer.

The operations if the cordless telephone 2 moves into the service area 110 from the service area 108 will be described below.

Also in this case, if the timer section 8a takes the time-out (Step S1), the number extracting section 28 extracts the base station number of the outdoor public system from the control signal received by the receiving unit 3. Here, since the cordless telephone 2 exists inside the service area 110, the number extracting section 28 can extract the base station number of the outdoor public system base station 104 (YES at Step S2).

The comparing section 32 compares the base station number extracted by the number extracting section 28 with the base station number of the outdoor public system stored in the base station number storage section 12 (Step S3). As mentioned above, the base station number of the outdoor public system base station 104 is stored in the base station number storage section 12. Thus, in this case, the comparison result is consistent, differently from the above-mentioned case (YES at Step S3).

Thus, the search control section 34 does not control the number searching section 26 to make the period of the waiting operation longer. Then, the number searching section 26 carries out the waiting operation in the time interval of about 10 seconds, similarly to the case that the cordless telephone 2 exists inside the service area 108 of the independent system (Step S6). At this time, the search control section 34 resets the counter unit 8b to set 0 as the value N (Step S7).

The number searching section 26 extracts the base station number from the control signal 116, similarly to the actually above-mentioned case that the cordless telephone 2 exists inside the service area 108 to compare the extracted base station number with the base station number of the independent system stored in advance in the registration system storage section 10 (Step S8).

In this case, since the comparison result is consistent (YES at Step S8), the number searching section 26 judges that the base station number of the independent system is included in the control signal 116. Then, the number extracting section 28 extracts the base station number of the outdoor public system from the control signal received by the receiving unit.

Since the judged result of the number searching section 26 is positive as mentioned above, the storage control section 30 stores the base station number of the outdoor public system base station 104 extracted by the number extracting section 28 at that time, in the base station number storage section 12 (Step S9).

After that, the number searching section 26 carries out the waiting operation in a time interval of about 10 seconds.

The base station number of the outdoor public system base station 104 to be stored in the base station number storage section 12 is detected from the control signal 118 received by the receiving unit 3 next to the control signal 116 in which the number searching section 26 judges that the base station number of the independent system is included.

The base station number of the outdoor public system base station 104 to be stored in the base station number storage section 12 is extracted from the control signal 118 received by the receiving unit 3 in the same time interval when the control signal 116 in which the number searching section 26 judges that the base station number of the independent system is included, is received by the receiving unit 3.

As mentioned above, in this embodiment, if the cordless telephone 2 moves from the service area 108 of the independent system base station 102 into the service area 110 of the outdoor public system base station 104 adjacent to the independent system base station 102, the waiting operation to the independent system base station 102 is carried out in the same time interval as the case that the cordless telephone 2 exists inside the service area 108 of the independent system. Thus, even if the cordless telephone 2 immediately returns back into the service area 108 from the service area 110, it is possible to rapidly make a call through the independent system base station 102.

In addition, if the cordless telephone 2 exists outside the service area 108 and further the cordless telephone 2 does not belong to any one of the service areas 110, 112, the number extracting section 28 can not extract the base station number of the outdoor public system at the step S2 (NO). Thus, the search control section 34 does not change the above-mentioned time interval of the waiting operation. Hence, the number searching section 26 carries out the waiting operation to the independent system base station 102 in the time interval of about 10 seconds (Step S6).

If a new outdoor public system base station (not shown) is provided near the independent system base station 102, or if the base station number of the existing outdoor public system base station 104 is changed, it is necessary to update the base station number of the outdoor public system to be stored in the base station number storage section 12. This update operation is done by the storage control section 30, each time the number searching section 26 judges that the base station number of the independent system is included in the control signal in the time interval of about 10 seconds, when the cordless telephone 2 exists inside the service area 108.

If the cordless telephone 2 returns back to the service area 108 from the service area 112, immediately after that, the number searching section 26 carries out the waiting operation in the time interval of about 10 minutes. Also in this case, if the number searching section 26 judges that the base station number of the independent system is included in the control signal, the storage control section 30 updates the content of the base station number storage section 12.

By the way, in this embodiment, the time interval of the waiting operation to the independent system is set to be longer, if the cordless telephone 2 moves into the service area 112 of the outdoor public system base station 106 far away from the service area 108 of the independent system. In order to make the consumption power further lower, it is possible to stop the performance of the number searching section 26, that is, the waiting operation to the independent system base station 102 as shown in FIG. 8.

As mentioned above, in the communication method of the cordless telephone according to the present invention, if in the number searching step it is judged that the base station number of the independent system is included in the control signal, the base station number of the outdoor public system extracted in the number extracting step is stored in the storing unit in the storage control step. Then, if in the number searching step it is judged that the base station number of the independent system is not included in the control signal and further the base station number of the outdoor public system and the base station number stored in the storing unit do not coincide with each other as the comparison result in the comparing step, in the search control step the time interval to judge whether or not the base station number of the independent system is included in the control signal in the number searching step, is set to the second time interval longer than the first time interval.

In addition, in the cordless telephone of the present invention, if the number searching section judges that the base station number of the independent system is included in the control signal, the storage control section stores in the storing unit the base station number of the outdoor public system extracted by the number extracting section. Then, if the number searching section judges that the base station number of the independent system is not included in the control signal and further the base station number of the outdoor public system and the base station number stored in the storing unit do not coincide with each other as the comparison result of the comparing unit, the search control section sets the time interval, in which the number searching section judges whether or not the base station number of the independent system is included in the control signal, to the second time interval longer than the first time interval.

Thus, in the present invention, if the cordless telephone exists at the location far away from the independent system base station, the time interval to carry out the waiting operation to the independent system is set to be longer. As a result, it is possible to reduce the consumption power of the cordless telephone. Then, since the cordless telephone exists at the location far away from the independent system base station, there is no possibility that the cordless telephone immediately returns back into the service area of the independent system. Hence, even if the time interval of the waiting operation is made longer, the trouble is never induced.

The following inventions will be disclosed in this specification.

This is a communication method of a cordless telephone that can make a call through both an independent system base station and an outdoor public system base station, and executes a receiving step of receiving a control signal transmitted from each base station of the independent system and the outdoor public system and a number searching step of searching periodically in a first time interval the control signal received at the reception step and then judging whether or not a base station number of the independent system is included in the control signal, and includes a storing unit for storing the base station number of the outdoor public system, and further includes:

a number extracting step of periodically extracting the base station number of the outdoor public system from the control signal received at the reception step;

a storage control step of storing the base station number of the outdoor public system extracted at the number extracting step in the storing unit, if it is judged at the number searching step that the base station number of the independent system is included in the control signal;

a comparing step of comparing the base station number extracted at the number extracting step with the base station number stored in the storing unit, each time the base station number of the outdoor public system is extracted at the number extracting step; and a search control step of setting a time interval to judge whether or not the base station number of the independent system is included in the control signal at the number searching step, to a second time interval longer than the first time interval, if it is judged at the number searching step that the base station number of the independent system is not included in the control signal and further the base station number of the outdoor public system and the base station number stored in the storing unit do not coincide with each other in the comparing step.

This is a cordless telephone that can make a call through both an independent system base station and an outdoor public system base station, and includes a receiving unit for receiving a control signal transmitted from each base station of the independent system and the outdoor public system and a number searching section for searching periodically in a first time interval the control signal received by the receiving unit and then judging whether or not a base station number of the independent system is included in the control signal, and further includes:

- a storing unit for storing the base station number of the outdoor public system;
- a number extracting unit for periodically extracting the base station number of the outdoor public system from the control signal received by the receiving unit;
- a storage control unit for storing the base station number of the outdoor public system extracted by the number extracting unit, if the number searching section judges that the base station number of the independent system is included in the control signal;
- a comparing unit for comparing the base station number extracted by the number extracting unit with the base station number stored in the storing unit, each time the number extracting unit extracts the base station number of the outdoor public system; and
- the search control unit for controlling the number searching section so as to judge whether or not the base station number of the independent system is included in the control signal in a second time interval longer than the first time interval, if the number searching section judges that the base station number of the independent system is not included in the control signal and further the base station number of the outdoor public system and the base station number stored in the storing unit do not coincide with each other as the comparison result of the comparing unit.

In the communication method of the cordless telephone, if it is judged in the number searching step that the base station number of the independent system is included in the control signal, the base station number of the outdoor public system extracted in the number extracting step is stored in the storing unit in the storage control step. Then, if it is judged in the number searching step that the base station number of the independent system is not included in the control signal and further the base station number of the outdoor public system and the base station number stored in the storing unit do not coincide with each other as the comparison result of the comparing step, in the search control step a time interval to judge in the number searching step whether or not the base station number of the independent system is included in the control signal, is set to a second time interval longer than a first time interval.

In the cordless telephone, if the number searching section judges that the base station number of the independent system is included in the control signal, the storage control unit stores the base station number of the outdoor public system extracted by the number extracting unit in the storing unit. Then, if the number searching section judges that the base station number of the independent system is not included in the control signal and further the base station number of the outdoor public system and the base station number stored in the storing unit do not coincide with each other as the comparison result of the comparing unit, the search control unit sets a time interval in which the number searching section judges whether or not the base station number of the independent system is included in the control signal, to a second time interval longer than a first time interval.

Thus, in the present invention, if the cordless telephone exists at the location far away from the independent system base station, the time interval to carry out the waiting operation to the independent system is set to be longer. As a result, it is possible to reduce the consumption power of the cordless telephone. Then, since the cordless telephone exists at the location far away from the independent system base station, there is no possibility that the cordless telephone immediately returns back into the service area of the independent system. Hence, even if the time interval of the waiting operation is made longer, the trouble is never induced.

What is claimed is:

1. A radio communication method, comprising the steps of:
   (a) providing a mobile station which can make a call through each of an independent system base station and an outdoor public system base station; and
   (b) changing a period when a waiting operation to said independent system base station is performed based on a distance between said mobile station and said independent system base station and depending on whether said mobile station belongs to a specific region wherein said specific region includes at least a part of a receiving region of said independent system base station and is wider than said at least a part of said receiving region of said independent system base station.

2. A radio communication method according to claim 1, wherein said specific region includes said receiving region of said independent system base station and a receiving region of said outdoor public system base station adjacent to said independent system base station.

3. A radio communication method comprising the steps of:
   (a) providing a mobile station which can make a call through each of an independent system base station and an outdoor public system base station; and
   (b) changing a period when a waiting operation to said independent system base station is performed based on a distance between said mobile station and said independent system base station, said changing a period step being performed by the steps of
   (c) judging in a first period as said period whether or not said mobile station belongs to a receiving region of said independent system base station as an independent receiving region based on a receiving signal received by said mobile station;
   (d) detecting, as an unspecific outdoor public system base station, said outdoor public system base station to whose receiving region said mobile station belongs, regardless of whether said mobile station belongs to said independent receiving region or not;
   (e) detecting, as a specific outdoor public system base station, said outdoor public system base station to whose receiving region said mobile station belongs, when it is judged as a result of said (c) step that said mobile station belongs to said independent receiving region;
   (f) comparing said detected unspecific outdoor public system base station with said detected specific outdoor public system base station;
   (g) detecting said distance based on a result of said (f) step;
   (h) judging whether or not said detected distance is larger than a predetermined value; and
   (i) performing said (c) step in a second period longer than said first period when it is judged as said result of said (c) step that said mobile station does not belong to said independent receiving region and it is judged as a judgment result of said (h) step that said detected distance is larger than said predetermined value.

4. A radio communication method according to claim 3, wherein said (c) step includes judging that said mobile station belongs to said independent receiving region, when said receiving signal received by said mobile station has an independent system base station identification signal indicating that said receiving signal is transmitted from said independent system base station, said (d) step includes detecting said unspecific outdoor public system base station, based on an outdoor public system base station identification signal included in said receiving signal, indicating that said receiving signal is transmitted from said outdoor public system base station, and said (e) step includes detecting said specific outdoor public system base station, when it is judged that a first receiving signal corresponding to said receiving signal has said independent system base station identification signal as a result of said (c) step, based on said outdoor public system base station identification signal included in a second receiving signal received by said mobile station immediately after said first receiving signal.

5. A radio communication method according to claim 4, wherein said (e) step includes detecting said specific outdoor public system base station, based on said outdoor public system base station identification signal included in said receiving signal received next to said independent system base station identification signal by said mobile station.

6. A radio communication method according to claim 4, wherein said (e) step includes detecting said specific outdoor public system base station, based on said outdoor public system base station identification signal included in said receiving signal received in a same period as said period when said independent system base station identification signal is received.

7. A radio communication method according to claim 3, wherein said (f) step is performed each time said unspecific outdoor public system base station is detected as a result of said (d) step.

8. A radio communication method according to claim 3, further comprising (j) performing said (c) step in said first period, when it is judged as said result of said (c) step that said mobile station belongs to said independent receiving region or when it is judged as said result of said (h) step that said detected distance is not larger than said predetermined value, and when said (c) step is performed in said second period.

9. A radio communication method comprising the steps of:

(a) providing a mobile station which can make a call through each of an independent system base station and an outdoor public system base station; and (b) changing a period when a waiting operation to said independent system base station is performed based on a distance between said mobile station and said independent system base station, said changing a period step being performed by the steps of (c) judging in a first period as said period whether or not said mobile station belongs to a receiving region of said independent system base station as an independent receiving region based on a receiving signal received by said mobile station;

(d) detecting, as an unspecific outdoor public system base station, said outdoor public system base station to whose receiving region said mobile station belongs, regardless of whether said mobile station belongs to said independent receiving region or not;

(e) detecting, as a specific outdoor public system base station, said outdoor public system base station to whose receiving region said mobile station belongs, when it is judged as a result of said (c) step that said mobile station belongs to said independent receiving region;

(f) comparing said detected unspecific outdoor public system base station with said detected specific outdoor public system base station; and (k) performing said (c) step in a second period longer than said first period when it is judged as a result of said (c) step that said mobile station does not belong to said independent receiving region ant it is judged as a result of said (f) step that said unspecific outdoor public system base station and said specific outdoor public system base station do not coincide with each other.

10. A radio communication apparatus that can make a call through each of an independent system base station and an outdoor public system base station, comprising:

a timer for counting a time period during which a waiting operation to said independent system base station is performed; and a control section for controlling said timer such that said time period is changed in according with a distance between said radio communication apparatus and said independent system base station, wherein said control section changes said time period depending on whether said radio communication apparatus belongs to a specific region, wherein said specific region includes at least a part of a receiving region of said independent system base station and is wider than said at least a part of said receiving region of said independent system base station.

11. A radio communication apparatus that can make a call through each of an independent system base station and an outdoor public system base station, comprising:

a timer for counting a time period during which a waiting operation to said independent system base station is performed; and a control section for controlling said timer such that said time period is changed in according with a distance between said radio communication apparatus and said independent system base station, said control section including a judging means for judging as a specific judgment in a first period whether or not said radio communication apparatus belongs to a receiving region of said independent system base station as an independent receiving region, based on a receiving signal received by said radio communication apparatus;

a first detecting means for detecting, as an unspecific outdoor public system base station, said outdoor public system base station to whose receiving region said radio communication apparatus belongs, regardless of a result of said specific judgment;

a second detecting means for detecting, as a specific outdoor public system base station, said outdoor public system base station to whose receiving region said radio communication apparatus belongs, when said judging means judged that said radio communication apparatus belongs to said independent receiving region as said specific judgment;

a comparing means for comparing said detected unspecific outdoor public system base station with said detected specific outdoor public system base station;

a detecting means for detecting said distance based on a comparison result by said comparing means;

a determining means for determining whether or not said detected distance is larger than a predetermined value; and a control means for controlling said judging means such that said judging means performs said specific judgment in a second period longer than said first period when said judging means judged that said radio communication apparatus does not belong to said independent receiving region and said determining means determined that said detected distance is larger than said predetermined value.

12. A radio communication apparatus according to claim 11, wherein said judging means judges that said radio communication apparatus belongs to said independent receiving region, when said receiving signal received by said radio communication apparatus has an independent system base station identification signal indicating that said receiving signal is transmitted from said independent system base station, said first detecting means detects said unspecific outdoor public system base station, based on an outdoor public system base station identification signal included in said receiving signal, indicating that said receiving signal is transmitted from said outdoor public system base station, and said second detecting means detects said specific outdoor public system base station when said judging means judged that a first receiving signal corresponding to said receiving signal has said independent system base station identification signal, based on said outdoor public system base station identification signal included in a second receiving signal received by said radio communication apparatus immediately after said first receiving signal.

13. A radio communication apparatus that can make a call through each of an independent system base station and an outdoor public system base station, comprising:

a timer for counting a time period during which a waiting operation to said independent system base station is performed; and a control section for controlling said timer such that said time period is changed in according with a distance between said radio communication apparatus and said independent system base station, said control section including a judging means for judging as a specific judgment in a first period whether or not said radio communication apparatus belongs to a receiving region of said independent system base station as an independent receiving region, based on a receiving signal received by said radio communication apparatus;

a first detecting means for detecting, as an unspecific outdoor public system base station, said outdoor public system base station of which said radio communication apparatus belongs to a receiving region, regardless of a result of said specific judgment;

a second detecting means for detecting, as a specific outdoor public system base station, said outdoor public system base station of which said radio communication apparatus belongs to a receiving region, when said judging means judged that said radio communication apparatus belongs to said independent receiving region as said specific judgment;

a comparing means for comparing said detected unspecific outdoor public system base station with said detected specific outdoor public system base station to determine that said detected unspecific outdoor public system base station and said detected specific outdoor public system base station coincide with each other or not; and a control means for controlling said judging means such that said judging means performs said specific judgment in a second period longer than said first period when said judging means judged that said radio communication apparatus does not belong to said independent receiving region and said comparing means determined that said unspecific outdoor public system base station and said specific outdoor public system base station do not coincide with each other.

14. A computer readable recording medium for recording a program for a process, comprising:

(a) judging as a specific judgment in a first period whether or not a mobile station belongs to a receiving region on an independent system base station as an independent receiving region, based on a receiving signal received by said mobile station;

(b) detecting, as an unspecific outdoor public system base station, an outdoor public system base station, to whose receiving region said mobile station belongs, regardless of a result of said specific judgment;

(c) detecting, as a specific outdoor public system base station, said outdoor public system base station, to whose receiving region said mobile station belongs, when it is judged as said result of said specific judgment that said mobile station belongs to said independent receiving region;

(d) comparing said detecting unspecific outdoor public system base station with said detected specific outdoor public system base station; and (e) performing said (a) step in a second period longer than said first period when it is judged as said result of said specific judgment that said mobile station does not belong to said independent receiving region and it is judged as a result of said (d) step that said unspecific outdoor public system base station and said specific outdoor public system base station do not coincide with each other.

* * * * *